United States Patent
Nguyen et al.

(10) Patent No.: US 12,034,625 B2
(45) Date of Patent: Jul. 9, 2024

(54) ACKNOWLEDGMENT FEEDBACK FOR GROUPCAST OPTION 1 SIDELINK COMMUNICATION

(71) Applicant: QUALCOMM Incorporated, San Diego, CA (US)

(72) Inventors: Tien Viet Nguyen, Bridgewater, NJ (US); Sourjya Dutta, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 17/446,911

(22) Filed: Sep. 3, 2021

(65) Prior Publication Data

US 2022/0124018 A1 Apr. 21, 2022

Related U.S. Application Data

(60) Provisional application No. 63/094,334, filed on Oct. 20, 2020.

(51) Int. Cl.
*H04L 43/16* (2022.01)
*H04L 1/1812* (2023.01)
*H04L 5/00* (2006.01)
*H04L 12/18* (2006.01)
*H04W 24/08* (2009.01)
*H04W 72/20* (2023.01)

(52) U.S. Cl.
CPC ............ *H04L 43/16* (2013.01); *H04L 1/1812* (2013.01); *H04L 5/0055* (2013.01); *H04L 12/18* (2013.01); *H04W 24/08* (2013.01); *H04W 72/20* (2023.01)

(58) Field of Classification Search
CPC ..... H04L 43/16; H04L 1/1812; H04L 5/0055; H04L 12/18; H04L 1/20; H04L 2001/0093; H04L 12/189; H04L 12/1863; H04W 24/08; H04W 72/20
See application file for complete search history.

(56) References Cited

U.S. PATENT DOCUMENTS

2019/0044667 A1* 2/2019 Guo ................... H04L 1/1822
2019/0052436 A1* 2/2019 Desai .................. H04L 5/0055
(Continued)

*Primary Examiner* — Steven Hieu D Nguyen
(74) *Attorney, Agent, or Firm* — ArentFox Schiff LLP

(57) ABSTRACT

Apparatus, methods, and computer-readable media for acknowledgment feedback for groupcast option 1 sidelink communication are disclosed herein. An example method of wireless communication at a receiving user equipment (UE) includes determining whether a data signal associated with a groupcast transmission from a transmitting UE is decodable at the receiving UE and obtaining measurements of the data signal when the data signal is decodable at the receiving UE. The example method also includes determining whether the measurements exceed a threshold and transmitting a first type of feedback to the transmitting UE when the measurements do not exceed the threshold. An example method of wireless communication at a transmitting UE includes receiving, from a receiving UE over a sidelink channel, feedback comprising the first type of feedback when the first UE is determined to monitor for the first type of feedback and a second type of feedback from a plurality of UEs.

18 Claims, 9 Drawing Sheets

(56) References Cited

U.S. PATENT DOCUMENTS

| | | | |
|---|---|---|---|
| 2019/0052439 A1* | 2/2019 | Seo | H04L 1/1887 |
| 2020/0112400 A1* | 4/2020 | Lee | H04L 1/1819 |
| 2022/0045830 A1* | 2/2022 | Osawa | H04W 4/70 |
| 2022/0191725 A1* | 6/2022 | Ashraf | H04L 5/0053 |
| 2022/0312422 A1* | 9/2022 | Lee | H04W 72/53 |
| 2022/0353825 A1* | 11/2022 | Ryu | H04W 52/343 |

* cited by examiner

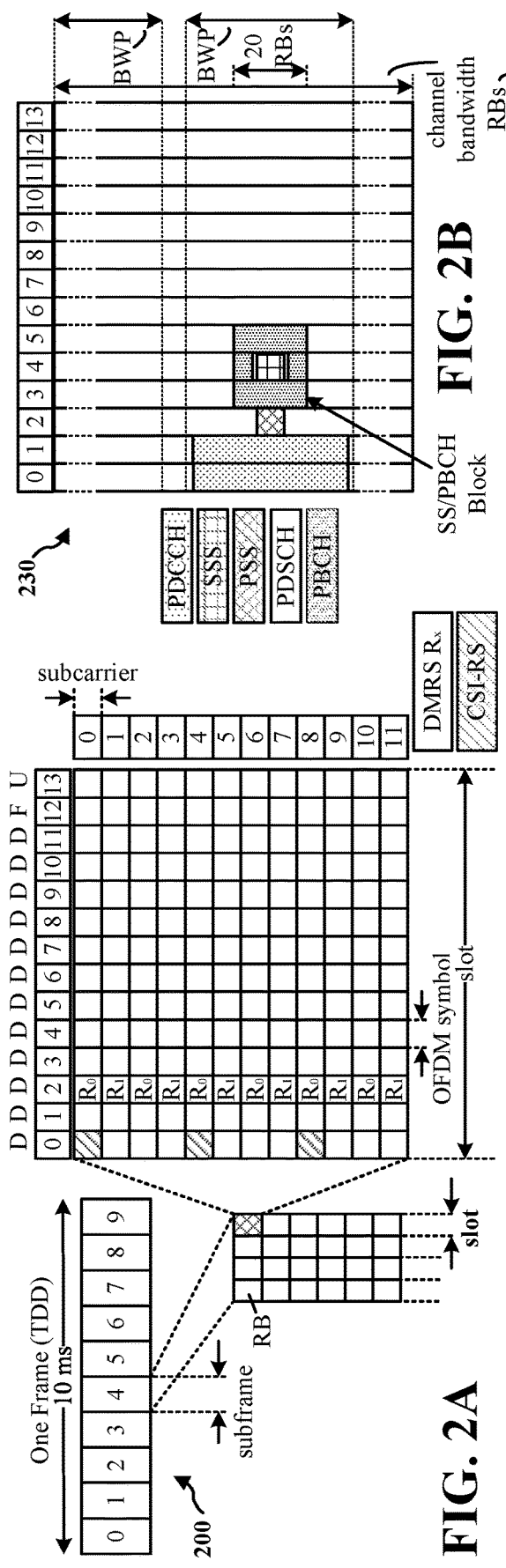
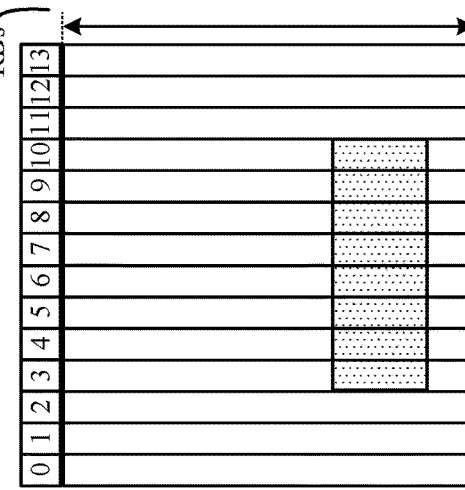
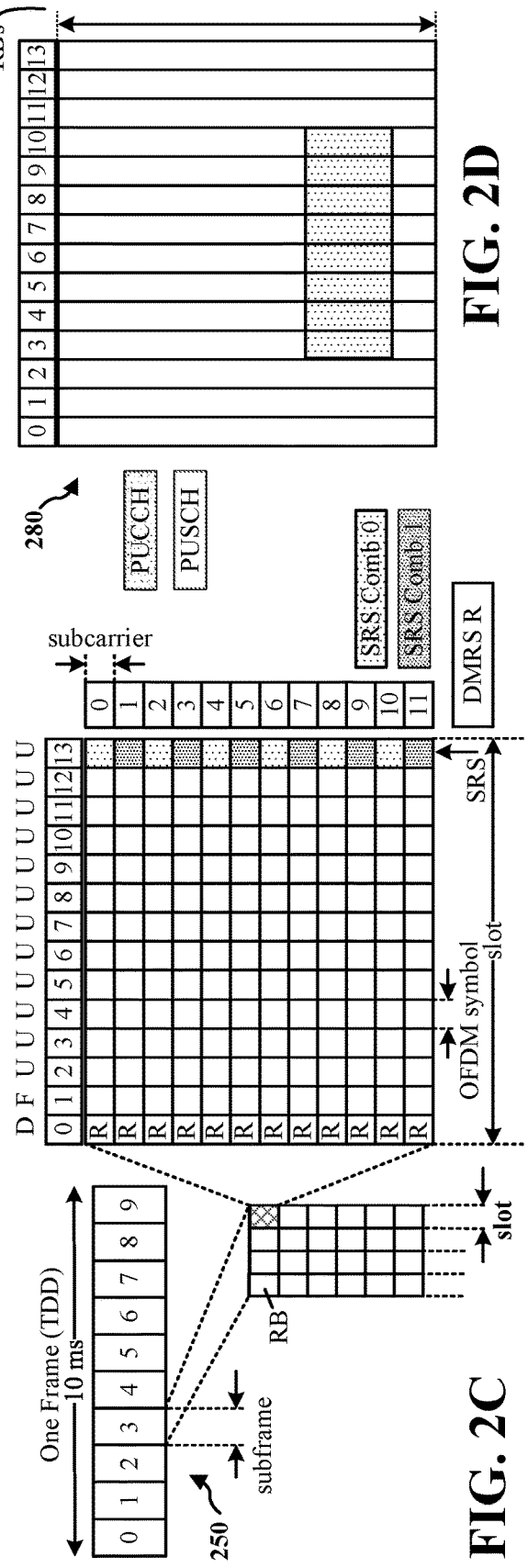
FIG. 2A  FIG. 2B  FIG. 2C  FIG. 2D

ACKNOWLEDGMENT FEEDBACK FOR GROUPCAST OPTION 1 SIDELINK COMMUNICATION

CROSS REFERENCE TO RELATED APPLICATION(S)

This application claims the benefit of U.S. Provisional Patent Application Ser. No. 63/094,334, entitled "ACKNOWLEDGMENT FEEDBACK FOR GROUPCAST OPTION 1 SIDELINK COMMUNICATION" and filed on Oct. 20, 2020, which is expressly incorporated by reference herein in its entirety.

BACKGROUND

Technical Field

The present disclosure generally relates to communication systems, and more particularly, to acknowledgment feedback for groupcast option 1 sidelink communication for vehicle-to-everything (V2X) or other device-to-device (D2D) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Aspects of wireless communication may include direct communication between devices, such as in V2X and/or other D2D communication. There exists a need for further improvements in V2X and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For sidelink communications with certain reliability requirements that experience a hidden node interference, a transmitting UE may not receive sidelink control information (SCI) of an interferer located on a non-line-of-sight path (e.g., the hidden node), which may interfere with one or more intended receivers of a data transmission. The transmitting UE may not be able to decode the SCI of the interferer due to signal strength issues (e.g., SINR) or traffic configuration (e.g., half duplex). In some aspects, a receiver UE may forward the SCI of the interferer, however, this may only protect one or more retransmissions in the future. If the receiver UE does not send any feedback, the retransmission may not occur and the protections offered to the receiver UE may not be effective. A typical use case is groupcast option 1, where all UEs are configured to send only negative acknowledgment (NACK) feedback at a single frequency network (SFN) resource. In operation, if some UEs are unable to decode the control signaling and other UEs can decode both the control and data signaling, then no UE may send feedback to the transmitting UE. In this respect, the transmitting UE may not retransmit the data signaling. This feedback behavior may be acceptable for data transmission services with standard reliability requirements, however, this feedback behavior may not be acceptable for data transmission services having high reliability requirements.

Feedback performance for groupcast option 1 sidelink communication may be improved by configuring a transmitting UE to monitor for both ACK and NACK feedback (instead of only NACK feedback) and configuring a receiving UE to also send ACK signaling in an SFN manner. However, not all receiving UEs are configured to send the ACK feedback. The receiving UEs identified as vulnerable UEs (e.g., UEs that are experiencing interference from a hidden node) are configured to send the ACK feedback. The receiving UEs may determine whether they are considered vulnerable UEs based on a comparison of a measured signal strength of a groupcast transmission to a threshold. The receiving UEs having measurements below the threshold are considered to be vulnerable and should transmit the ACK feedback. This will allow more vulnerable UEs to report back to the transmitting UE while restricting any receiving UEs that are relatively near the transmitting device from transmitting their ACK feedback since the nearby receiving UEs may saturate the sidelink feedback channel and drown out the feedback signaling from the more vulnerable receiving UEs. The transmitting UE may selectively monitor for both ACK and NACK feedback signaling to avoid any false alarm indications.

In an aspect of the disclosure, a method, a computer-readable medium, and an apparatus are provided. The apparatus is configured to determine whether a data signal associated with a groupcast transmission from a second UE is decodable at the first UE. The apparatus can obtain one or more measurements of the data signal when the data signal is decodable at the first UE. The apparatus can determine whether the one or more measurements exceed a threshold. The apparatus can transmit a first type of feedback to the second UE when the one or more measurements do not exceed the threshold.

In an aspect of the disclosure, a method, a computer-readable medium, and an apparatus are provided. The apparatus is configured to transmit, to a plurality of UEs over a sidelink channel, a data signal in a groupcast transmission. The apparatus can determine whether to monitor for one or more of a first type of feedback or a second type of feedback from the plurality of UEs for the groupcast transmission. The apparatus can monitor, from a second UE of the plurality of UEs over a sidelink channel, for feedback comprising the first type of feedback and the second type of feedback when the first UE is determined to monitor for the first type of feedback and the second type of feedback from the plurality of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
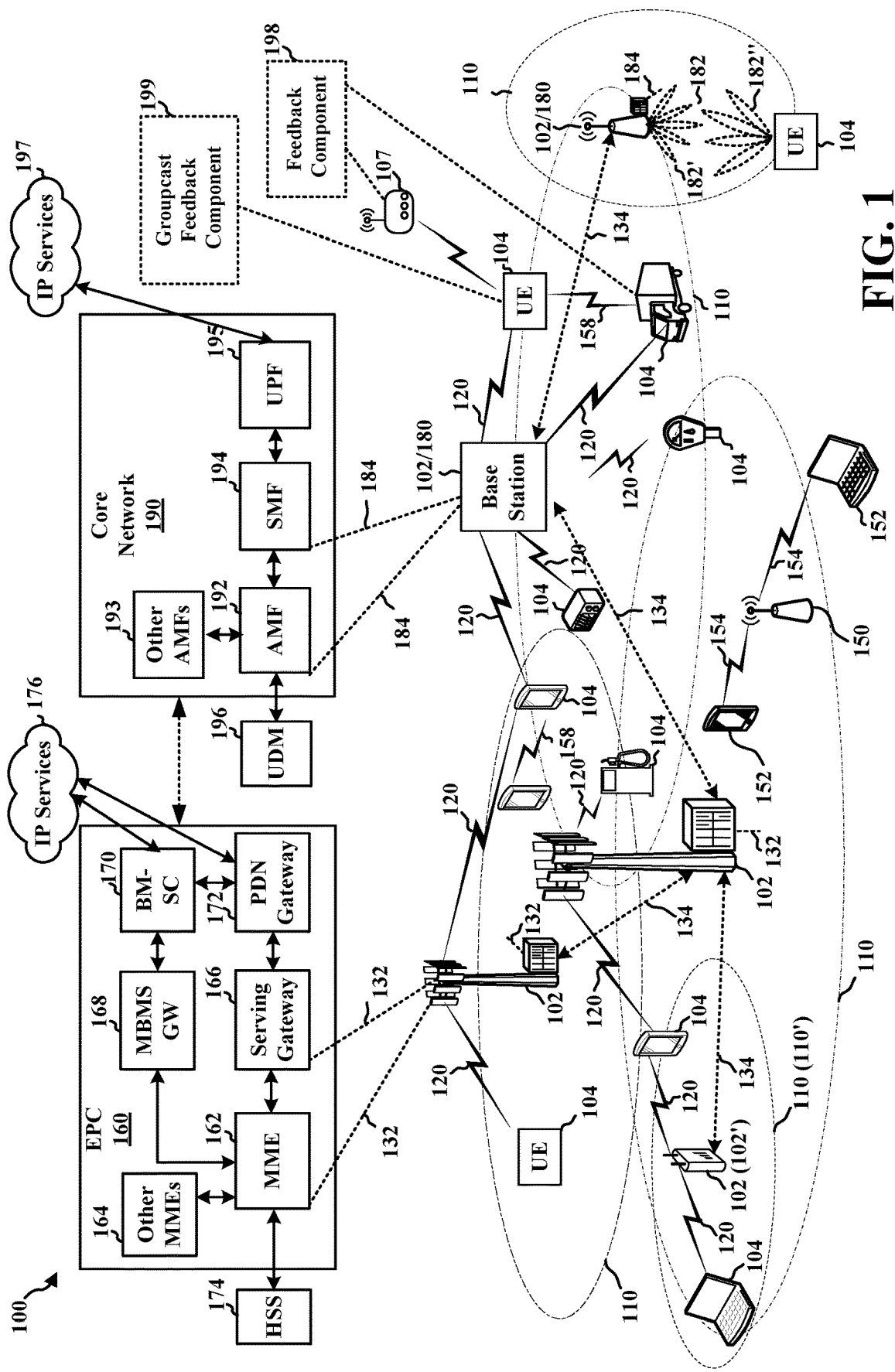
FIG. 1 is a diagram illustrating an example of a wireless communications system and an access network, in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including device(s) configured to perform the resource reevaluation aspects described herein. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

For sidelink communications with certain reliability requirements that experience a hidden node interference, a transmitting UE may not receive SCI of a transmitter located on a non-line-of-sight path (e.g., the hidden node), which may interfere with one or more intended receivers of a data transmission. The transmitting UE may not be able to decode the SCI of the transmitter due to signal strength issues (e.g., SINR) or traffic configuration (e.g., half duplex). In some aspects, a receiver UE may forward the SCI of interfering devices that it can decode as the forwarded SCI information can assist the transmitting UE to select resources that do not overlap with any transmissions of the interfering devices. However, this may only protect one or more retransmissions in the future. If the receiver UE does not send any feedback, the retransmission may not occur and the protections offered to the receiver UE may not be effective. A typical use case is groupcast option 1, where all UEs are configured to send only NACK feedback at a SFN resource. In operation, if some UEs are unable to decode the control signaling and other UEs can decode both the control and data signaling, then no UE may send feedback to the transmitting UE. In this respect, the transmitting UE may not retransmit the data signaling. This feedback behavior may be acceptable for data transmission services with standard reliability requirements, however, this feedback behavior may not be acceptable for data transmission services having high reliability requirements.

Feedback performance for groupcast option 1 sidelink communication may be improved by configuring a transmitting UE to monitor for both ACK and NACK feedback (instead of only NACK feedback) and configuring a receiving UE to also send ACK signaling in an SFN manner. However, not all receiving UEs are configured to send the ACK feedback. The receiving UEs identified as vulnerable UEs (e.g., UEs that has weak links to the transmitter and hence more prone to interference from a possible hidden node) are configured to send the ACK feedback. The receiving UEs may determine whether they are considered vulnerable UEs based on a comparison of a measured signal strength of a groupcast transmission to a threshold. The receiving UEs having measurements below the threshold are considered to be vulnerable and should transmit the ACK feedback. This will allow more vulnerable UEs to report back to the transmitting UE while restricting any receiving UEs that are relatively near the transmitting device from transmitting their ACK feedback since the nearby receiving UEs may saturate the sidelink feedback channel and drown out the feedback signaling from the more vulnerable receiving UEs. The transmitting UE may selectively monitor for both ACK and NACK feedback signaling to avoid any false alarm indications.

In some examples, a UE 104 may be configured to manage one or more aspects of wireless communication by facilitating acknowledgment feedback for groupcast option 1 sidelink communication. As an example, in FIG. 1, the UE 104, the RSU 107, and/or other devices communicating as a receiving UE based on sidelink may include a feedback component 198 configured to determine whether a data signal associated with a groupcast transmission from a second UE is decodable at the first UE. The feedback component 198 can obtain one or more measurements of the data signal when the data signal is decodable at the first UE. The feedback component 198 can determine whether the one or more measurements exceed a threshold. The feedback component 198 can transmit a first type of feedback to the second UE when the one or more measurements do not exceed the threshold. In another example, in FIG. 1, the UE 104, the RSU 107, and/or other devices communicating as a transmitting UE based on sidelink may include a groupcast feedback component 199 configured to transmit, to a plurality of UEs over a sidelink channel, a data signal in a groupcast transmission. The groupcast feedback component 199 can determine whether to monitor for one or more of a first type of feedback or a second type of feedback from the plurality of UEs for the groupcast transmission. The groupcast feedback component 199 can receive, from a second UE of the plurality of UEs over a sidelink channel, feedback comprising the first type of feedback and the second type of feedback when the first UE is determined to monitor for the first type of feedback and the second type of feedback from the plurality of UEs. Further related aspects and features are described in more detail in connection with FIGS. 4-6. Although the following description may be focused on 5G NR, the concepts described herein may be applicable to other similar areas, such as LTE, LTE-A, CDMA, GSM, and other wireless technologies.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as ProSe, etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system and access network 100 in FIG. 1 (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The described features generally relate to acknowledgment feedback for groupcast option 1 sidelink communication for D2D communications. As such, the concepts described herein, though sometimes described specifically for V2X communications, can be applied to substantially any D2D communication technologies. For example, D2D communication technologies can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), vehicle-to-pedestrian (V2P) communications, pedestrian-to-vehicle (P2V) communications, a combination thereof and/or with other devices, which can be collectively referred to as vehicle-to-anything (V2X) communications. In V2X communications, vehicle-based communication devices can communicate with one another and/or with infrastructure devices over a sidelink channel. Continued support and implementation of V2X communications is provided in 5G NR communication technologies, as well as LTE and other wireless communication technologies. Though aspects are generally described herein in terms of D2D/V2X communications, the concepts and techniques can be similarly applied more generally to substantially any type of wireless communications.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
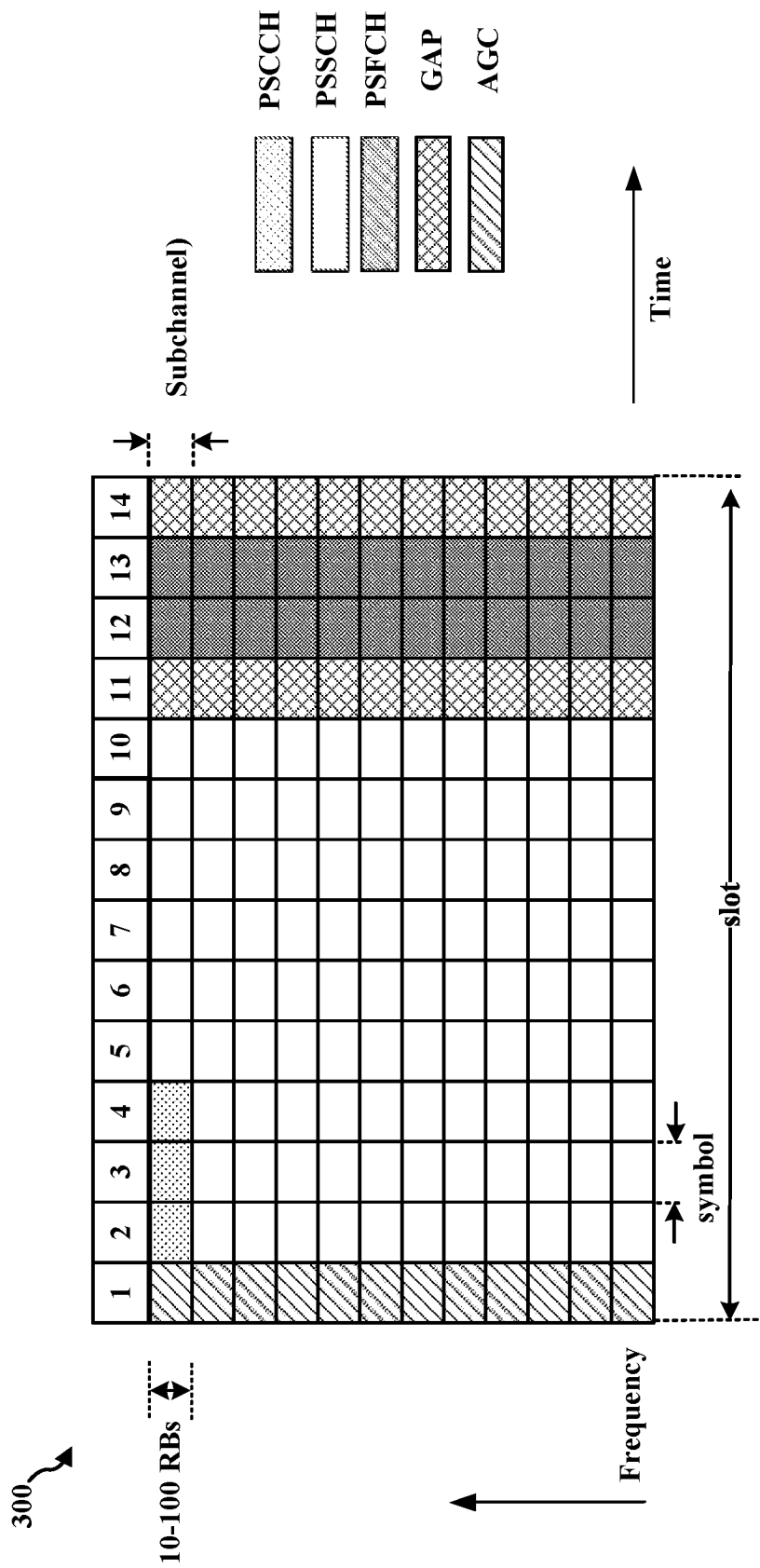
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
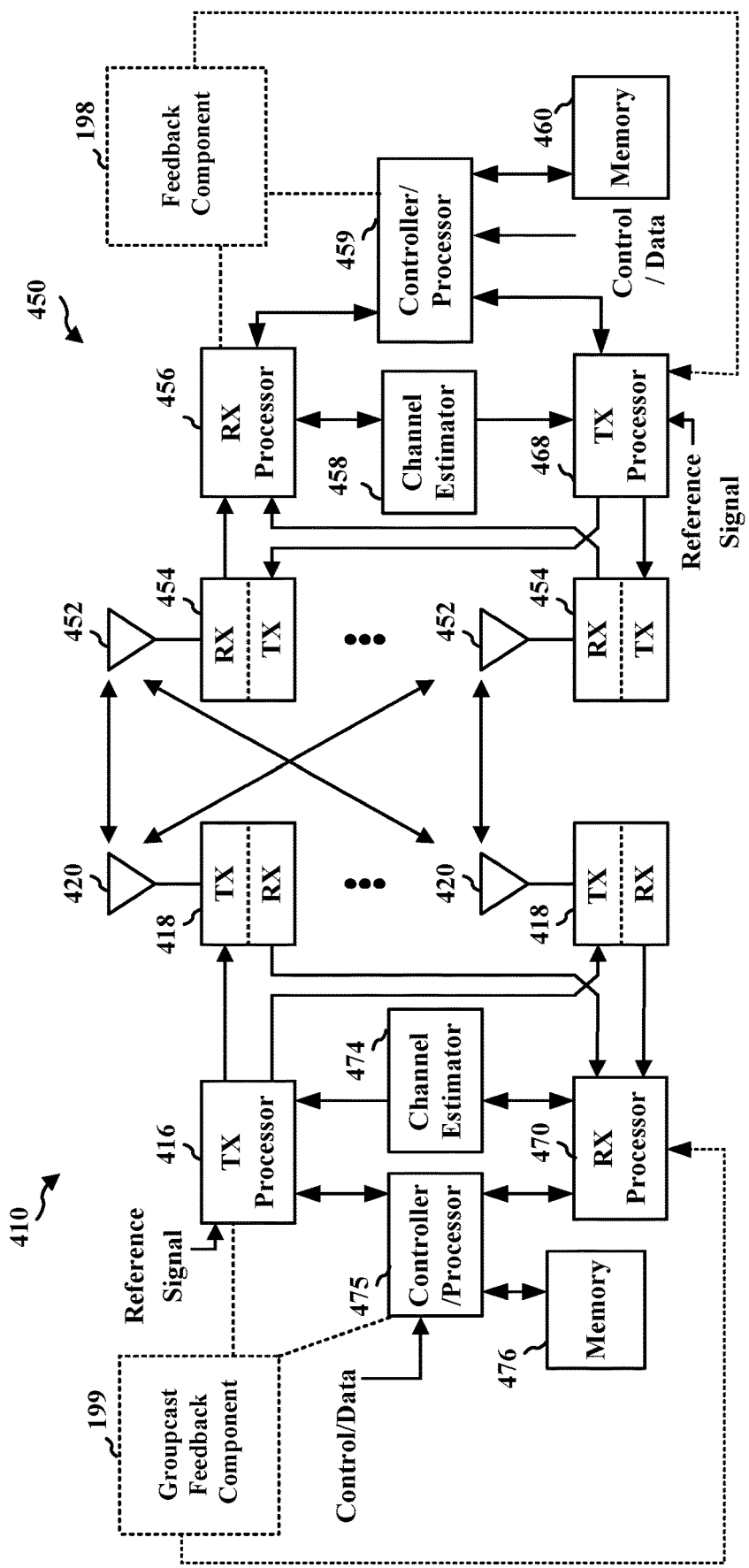
FIG. 4 is a diagram illustrating an example of a first device and a second device involved in wireless communication based, e.g., on V2X and/or other D2D communication, in accordance with aspects presented herein.

FIG. 4 is a block diagram 400 of a first wireless communication device 410 in communication with a second wireless communication device 450, e.g., via V2V, V2X or other D2D communication. The communication may be based, e.g., on sidelink using a PC5 interface. The transmitting device 410 and the 450 may comprise a UE, an RSU, etc. Packets may be provided to a controller/processor 475 that implements layer 4 and layer 2 functionality. Layer 4 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418TX. Each transmitter 418TX may modulate an RF carrier with a respective spatial stream for transmission.

At the device 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an acknowledgment (ACK) and/or negative acknowledgment (NACK) protocol to support Hybrid Automatic Repeat Request (HARD) operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The transmission is processed at the device 410 in a manner similar to that described in connection with the receiver function at the device 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

At least one of the TX processor 468, the RX processor 456, or the controller/processor 459 of device 450 may be configured to perform aspects described in connection with the feedback component 198 of FIG. 1.

At least one of the TX processor 416, the RX processor 470, or the controller/processor 475 may be configured to perform aspects described in connection with the groupcast feedback component 199 of FIG. 1.

Figure 5:
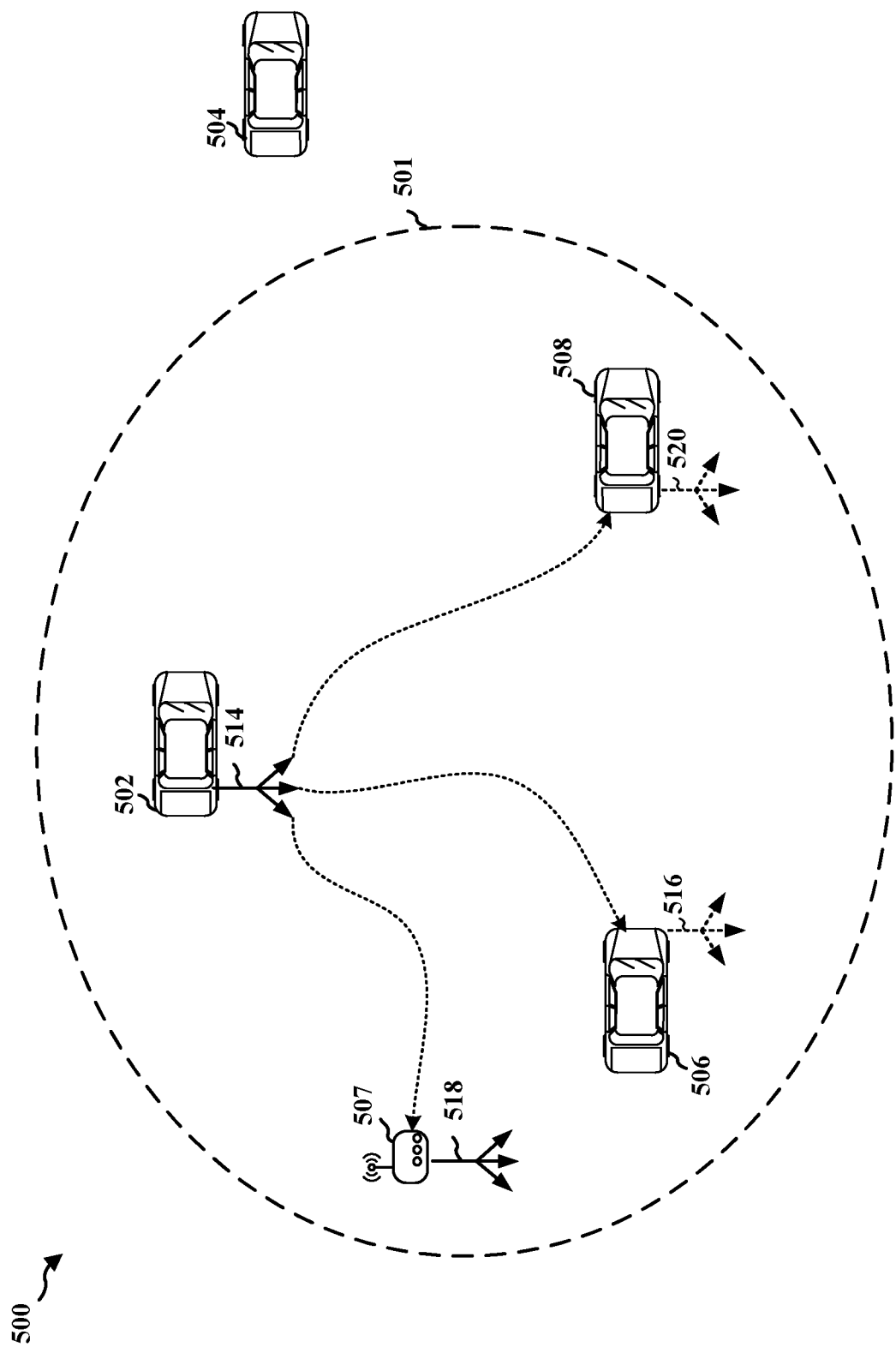
FIG. 5 illustrates example aspects of V2X and/or D2D communication between devices, in accordance with aspects presented herein.

FIG. 5 illustrates an example 500 of wireless communication between devices based on V2X or other D2D communication. The communication may be based on a slot structure. As an example, the slot structure may comprise aspects described in connection with FIG. 2. For example, UE 502 may transmit a transmission 514, e.g., comprising a control channel and/or a corresponding data channel, that may be received by UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmissions 516, 520. The transmissions 514, 516, 520 may be broadcast or groupcast to nearby devices. For example, UE 502 may transmit communication intended for receipt by other UEs within a range 501 of UE 502. Additionally/alternatively, RSU 507 may receive communication from and/or transmit communication to UEs 502, 504, 506, 508. One or more of the UEs 502, 504, 506, 508 or the RSU 507 that operate as receiving UEs may include a feedback component 198 as described in connection with FIG. 1. In other aspects, one or more of the UEs 502, 504, 506, 508 or the RSU 507 that operate as transmitting UEs may include a groupcast feedback component 199 as described in connection with FIG. 1.

Devices communicating based on V2X, or other D2D based communication, may determine a radio resource in the time and frequency domain that are used by other devices in order to select transmission resources that avoid collisions with other devices. As an example in a first mode (e.g., Mode 1), resources may be assigned by a serving cell (or base station) for sidelink transmissions. In a second mode (e.g., Mode 2), individual devices may autonomously select resources for sidelink transmission, e.g., without a central entity such as a base station indicating the resources for the device. A first device may reserve the selected resources in order to inform other devices about the resources that the first device intends to use.

In some aspects, the UE 502 may communicate with the UEs 506, 508 and RSU 507 via a groupcast transmission. In some examples, the UE 502 may serve as a transmitting UE in a groupcast transmission and the UEs 506, 508 and RSU 507 may serve as receiving UEs in the groupcast transmission. When HARQ operations are enabled for groupcast transmission, the HARQ operations may include support for groupcast option 1 and/or groupcast option 2. In option 1, the receiver UE may transmit only a HARQ NACK feedback. In some aspects, the HARQ NACK operation may include TX-RX distance-based HARQ feedback for groupcast. In option 2, the receiver UE may transmit both HARQ ACK/NACK feedback.

As described above in connection with groupcast option 1 sidelink communication, if some UEs are unable to decode the control signaling and other UEs can decode both the control and data signaling, then no UE may send feedback to the transmitting UE. In this respect, the transmitting UE may not retransmit the data signaling. This feedback behavior may be acceptable for data transmission services with standard reliability requirements, however, this feedback behavior may not be acceptable for data transmission services having high reliability requirements. Feedback performance for groupcast option 1 sidelink communication may be improved by configuring a transmitting UE to monitor for both ACK and NACK feedback (instead of only NACK feedback) and configuring a receiving UE to also send ACK signaling in an SFN manner. However, not all receiving UEs are configured to send the ACK feedback. The receiving UEs identified as vulnerable UEs (e.g., UEs that has weak links to the transmitter and hence more prone to interference from a possible hidden node) are configured to send the ACK feedback. The receiving UEs may determine whether they are considered vulnerable UEs based on a comparison of a measured signal strength of a groupcast transmission to a threshold. The receiving UEs having measurements below the threshold are considered to be vulnerable and should transmit the ACK feedback. This will allow more vulnerable UEs to report back to the transmitting UE while restricting any receiving UEs that are relatively near the transmitting device from transmitting their ACK feedback since the nearby receiving UEs may saturate the sidelink feedback channel and drown out the feedback signaling from the more vulnerable receiving UEs. The transmitting UE may selectively monitor for both ACK and NACK feedback signaling to avoid any false alarm indications.

A transmitting device, such as the UE 502, may transmit each packet multiple times. The UE 502 may retransmit the packet only if an intended receiver did not correctly receive the packet. For example, if the UE 506 responds with a NACK to the UE 502, the UE may determine to retransmit the packet. However, if the UE 502 does not receive a NACK and receives an ACK from any of the intended receivers, the UE 502 may determine that a retransmission of the packet is not needed and may refrain from retransmitting the packet. In this regard, the feedback performance can be improved by receiving either of ACK or NACK feedback from vulnerable receiving UEs (e.g., experience interference from interfering devices as hidden nodes) that helps to improve the reliability of groupcast transmissions with option 1 HARQ procedures.

Figure 6:
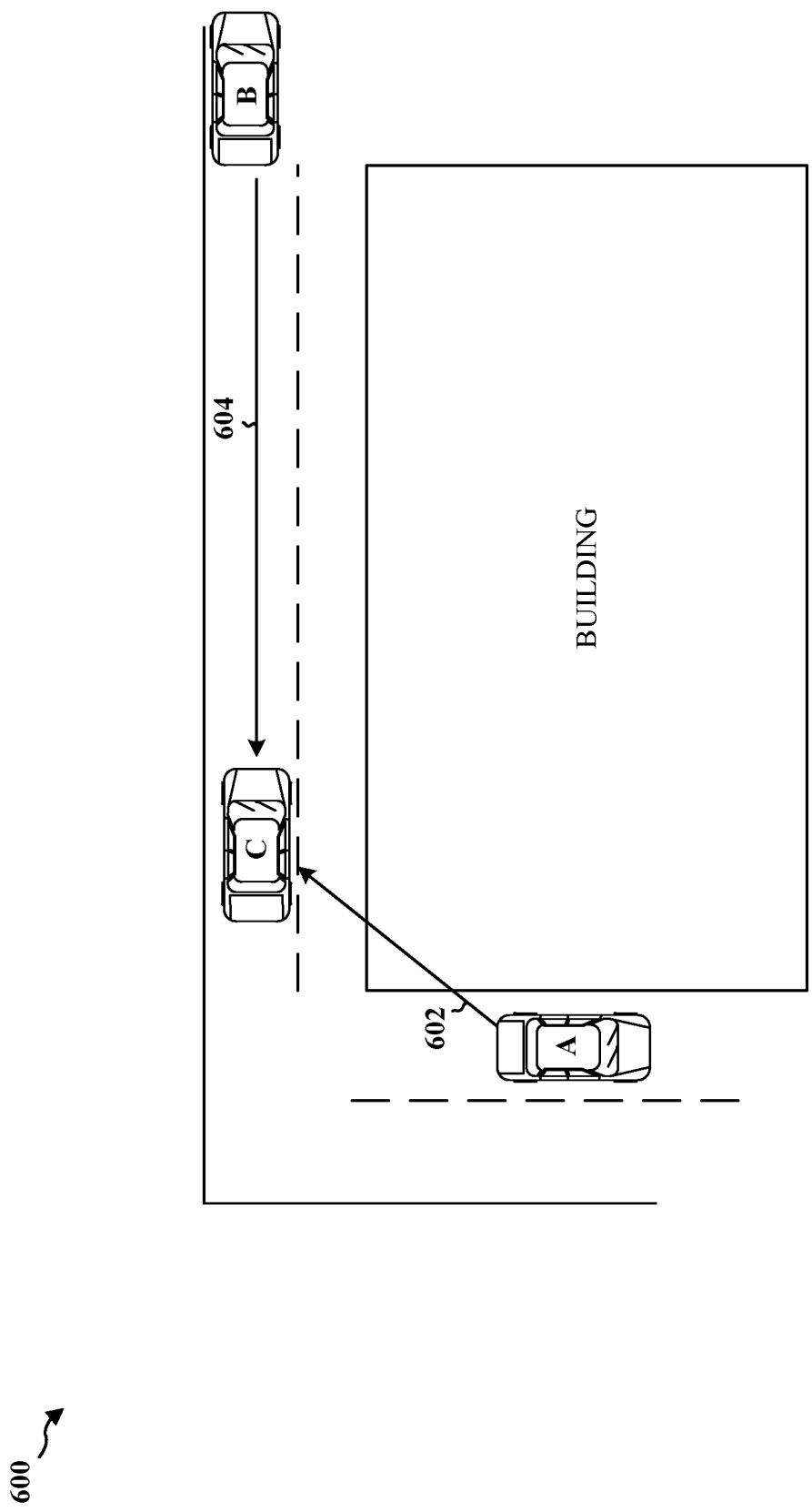
FIG. 6 illustrates a diagram showing a hidden node example.

FIG. 6 illustrates a diagram showing a hidden node example 600. In FIG. 6, device A is traveling on a first road and devices B and C are on a second road. Device B may be outside of a protected radius, e.g., an intended range, of device A. Therefore, the same time and frequency resources may be used for transmissions by device A and device B. Device C may be an intended receiver for transmissions 602 from device A. However, the signal from device A to device C may be weak, because the channel is a non-line of sight (NLOS) channel. In contrast, interference that device C experiences due to transmission 604 from device B may be substantial, because there is a line of sight (LOS) condition for devices B and C. As a result, device C may be unable to correctly receive and decode the transmission 602 from device A.

As described above for sidelink communications with certain reliability requirements that experience a hidden node interference, a transmitting UE (e.g., device A) may not receive the SCI of an interfering device (e.g., device B) located on a non-line-of-sight path (e.g., the hidden node), which may interfere with one or more intended receivers of a data transmission (e.g., device C). Device A may not be able to decode the SCI of device B due to signal strength issues (e.g., signal-to-interference-plus-noise ratio) or traffic configuration (e.g., half duplex). In some aspects, device C may forward the SCI of device B, however, this may only protect one or more retransmissions in the future. If device C does not send any feedback, the retransmission may not occur and the protections offered to device C may not be effective.

The present disclosure provides a mechanism to improve the feedback performance for groupcast option 1 sidelink communication by configuring device A to monitor for both ACK and NACK feedback (instead of only NACK feedback) and configuring device C (including devices similar to device C) to also send ACK signaling in an SFN manner. However, not all receiving UEs are configured to send the ACK feedback. The receiving UEs identified as vulnerable UEs (e.g., UEs that has weak links to the transmitter and hence more prone to interference from a possible hidden node) are configured to send the ACK feedback. In this example, device C is considered a vulnerable receiving UE that should report the ACK feedback if the data packet is received and decodable. The receiving UEs may determine whether they are considered vulnerable UEs based on a comparison of a measured signal strength of a groupcast transmission to a threshold. The receiving UEs having measurements below the threshold are considered to be vulnerable and should transmit the ACK feedback. This will allow more vulnerable UEs to report back to device A while restricting any receiving UEs that are relatively near the transmitting device from transmitting their ACK feedback since the nearby receiving UEs may saturate the sidelink feedback channel and drown out the feedback signaling from the more vulnerable receiving UEs. In some aspects, device A may selectively monitor for both ACK and NACK feedback signaling to avoid any false alarm indications. Therefore, the feedback performance can be improved by receiving either of ACK or NACK feedback from vulnerable receiving UEs (e.g., experience interference from interfering devices as hidden nodes) that helps to improve the reliability of groupcast transmissions with option 1 HARQ procedures.

Figure 7:
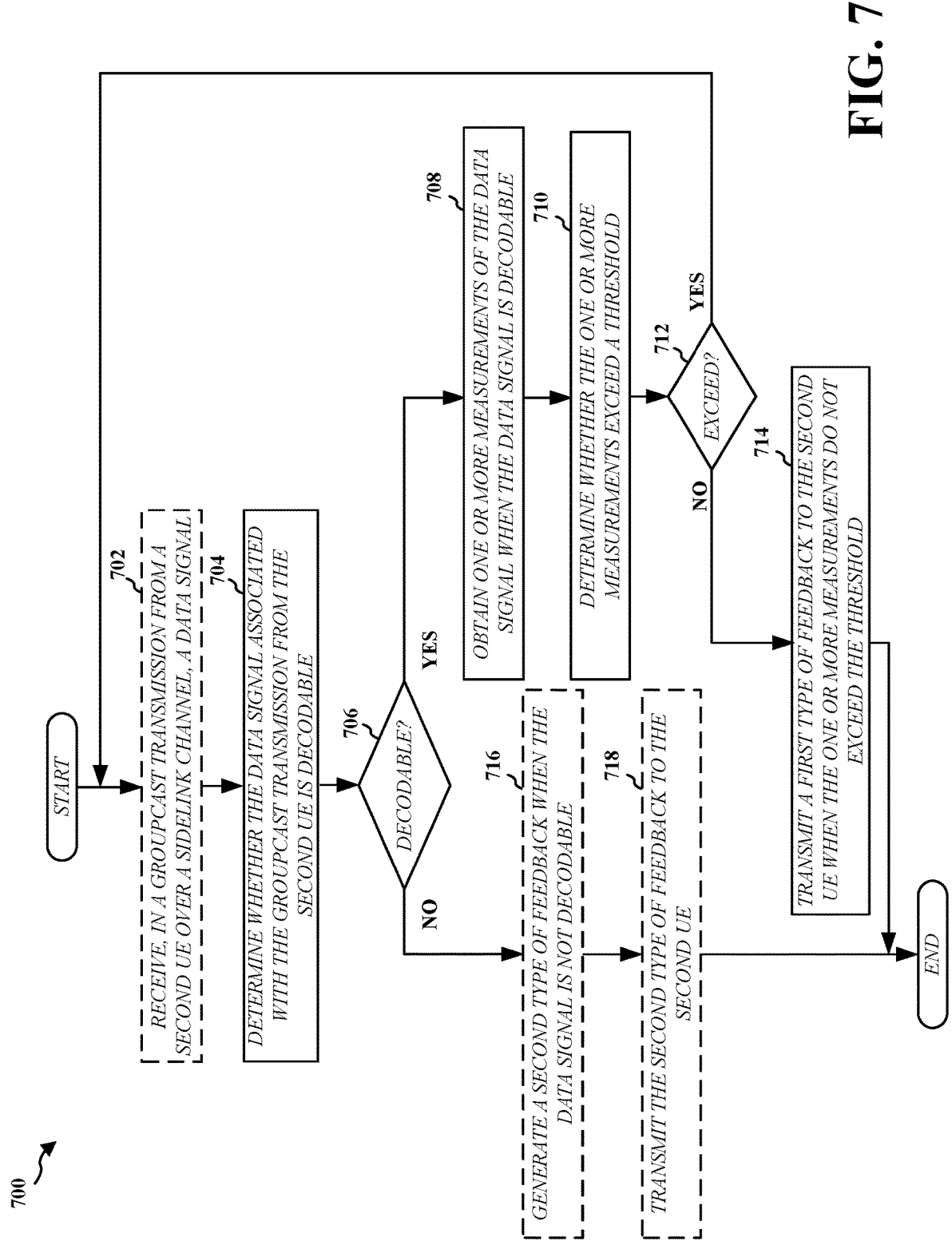
FIG. 7 is an example flowchart of a process of wireless communication at a receiving UE including acknowledgment feedback for groupcast option 1 sidelink communication, in accordance with aspects presented herein.

FIG. 7 is an example flowchart of a process 700 of wireless communication including acknowledgment feedback for groupcast option 1 sidelink communication. The process 700 may be performed by a wireless communication device (e.g., the UE 104, 502, 504, 506, 508; the device 410 or 450, the RSU 107, 507, which may include memory, a cellular baseband processor, and one or more components configured to perform the process 700). As illustrated, the process 700 includes a number of enumerated steps, but embodiments of the process 700 may include additional steps before, after, and in between the enumerated steps. In some embodiments, one or more of the enumerated steps may be omitted or performed in a different order. Optional aspects are illustrated with a dashed line. The process 700 enables a wireless communication device to randomly select resource without performing a sensing operation and perform the on-demand sensing based on resource reevaluation. Thus, the mechanism may reduce power consumption of UEs while increasing reliability of resource selection in sidelink communication. The process 700 enables the wireless communication device to perform on-demand sensing based on sidelink resource reevaluation.

At 702, a first wireless communication device may receive, in the groupcast transmission from the second wireless communication device over a sidelink channel, the data signal. The first wireless communication device may receive the data signal, e.g., as described in connection with FIGS. 1-6. 702 may be performed by one or more components described with respect to FIG. 4, e.g., processor 459, receive processor 456, receiver/transmitter 454 and/or antenna 452. The data signal may be received, e.g., by the groupcast transmission component 940 and the groupcast transmission decoder component 942 via the reception component 930 of the apparatus 902 in FIG. 9.

At 704, the first wireless communication device may determine whether a data signal associated with a groupcast transmission from a second wireless communication device is decodable at the first wireless communication device. The first wireless communication device may determine whether the data signal is decodable, e.g., as described in connection with FIGS. 1-6. 704 may be performed by one or more components described with respect to FIG. 4, e.g., processor 459 and/or receive processor 456. The data signal may be decodable, e.g., by the groupcast transmission decoder component 942 of the apparatus 902 in FIG. 9.

In some aspects, the first wireless communication device can generate a first type of feedback when the data signal is decodable at the first wireless communication device. In some implementations, the first wireless communication device may receive, from the second wireless communication device over a sidelink channel, a control signal. In some aspects of determining whether the data signal associated with the groupcast transmission from the second wireless communication device is decodable, in which the first wireless communication device can decode the control signal and determine that the data signal is decodable based on the control signal.

At 706, if the data signal is determined to be decodable, then the process 700 proceeds to block 708. Otherwise, if the data signal is determined not to be decodable, then the process 700 proceeds to block 716.

At 708, the first wireless communication device may obtain one or more measurements of the data signal when the data signal is decodable at the first wireless communication device. The first wireless communication device may obtain the measurements, e.g., as described in connection with FIGS. 1-6. 708 may be performed by one or more components described with respect to FIG. 4, e.g., processor 459, channel estimator 458 and/or receive processor 456. The one or more measurements may be obtained, e.g., by the groupcast transmission measurement component 944 of the apparatus 902 in FIG. 9. In obtaining the one or more measurements, the first wireless communication device can obtain one or more of a received signal strength indicator (RSSI) measurement, a reference signal received power (RSRP) measurement, a reference signal received quality (RSRQ) measurement, a signal-to-noise ratio (SNR), or a signal-to-interference-plus-noise ratio (SINR).

At 710, the first wireless communication device may determine whether the one or more measurements exceed a threshold. The first wireless communication device may determine whether the measurements exceed the threshold, e.g., as described in connection with FIGS. 1-6. 710 may be performed by one or more components described with respect to FIG. 4, e.g., processor 459 and/or receive processor 456. The one or more measurements may be compared to the threshold, e.g., by the groupcast transmission measurement component 944 and/or the threshold comparison component 946 of the apparatus 902 in FIG. 9. In some implementations, the first wireless communication device may receive, from a base station over a downlink channel, a configuration indicating a predetermined threshold that is used to configure the threshold, e.g., as described in connection with block 708. 708 may be performed by one or more components described with respect to FIG. 4, e.g., processor 459, receive processor 456, receiver/transmitter 454 and/or antenna 452. The configuration may be received, e.g., by the configuration processing component 950 via the reception component 930 of the apparatus 902 in FIG. 9. In some aspects, the first wireless communication device may receive the configuration in a downlink configuration carried in a RRC signal from the base station.

In some aspects, the first wireless communication device may determine the threshold based on a channel busy ratio. For example, the first wireless communication device may monitor a sidelink channel for a monitoring interval and determine an amount of time that the sidelink channel is busy within the monitoring interval. The first wireless communication device may determine the channel busy ratio, which corresponds to ratio of the amount of time that the sidelink channel is busy to a duration of the monitoring interval.

In some aspects, the first wireless communication device may determine the threshold based on a measured RSRP value. For example, the first wireless communication device may determine a plurality of RSRP values of the data signal and rank the plurality of RSRP values. The first wireless communication device may determine one or more lowest measured RSRP values from the plurality of RSRP values of the data signal based on the ranking. In this regard, the first wireless communication device may determine the threshold based on a percentage of the lowest measured RSRP values. In one or more implementations, the first wireless communication device may receive, from a base station over a downlink channel, a configuration indicating a predetermined percentage, in which the percentage, e.g., as described in connection with the lowest measured RSRP values, may be configured to correspond to the predetermined percentage.

In some aspects, the first wireless communication device may determine that the threshold is equivalent to a summation of a first resource exclusion RSRP threshold and a delta value (e.g., a delta dB above the first resource exclusion RSRP threshold), in which the delta value is a configurable parameter. In other aspects, the first wireless communication device may determine that the threshold is equivalent to a summation of a second resource exclusion RSRP threshold different than the first resource exclusion RSRP threshold and the delta value (e.g., a delta dB above the second resource exclusion RSRP threshold). In some implementations, the first resource exclusion RSRP threshold is adjusted by incrementing the first resource exclusion RSRP threshold by a predetermined increment value for each of a number of increments until a number of remaining resources reaches a predetermined percentage of total resources in a resource selection window. In some aspects, the second resource exclusion RSRP threshold corresponds to the adjusted first resource exclusion RSRP threshold.

In some implementations, the first wireless communication device may exclude resources reserved by another wireless communication device in a signal that is received having an RSRP above a threshold. In some examples, the RSRP threshold may be based on the amount of available resources. For example, if the amount of available resources is below a threshold (e.g., below 20%) within a resource selection window, the first wireless communication device may use an increased RSRP threshold so that the first wireless communication device is more likely to be able to reuse reserved resources. Similarly, the first wireless communication device may decrease the RSRP when there is a larger amount of available resources, e.g., to minimize the chance of a possible collision.

As an example, the first wireless communication device may use an initial RSRP threshold $\rho_{thresh}^0$, which may be referred to herein as an initial resource exclusion RSRP threshold (or an input exclusion RSRP threshold). In some aspects, the initial resource exclusion RSRP threshold may depend on a ProSe priority per packet (PPPP). If the measured RSRP for an SCI reserving resources is greater than $\rho_{thresh}^0$, the first wireless communication device may remove the resources overlapping with reserved resources from a candidate set of resources. The first wireless communication device may perform a comparison to the initial resource exclusion RSRP threshold and removal of resources from the candidate set for resources reserved in multiple SCI received from one or more wireless communication devices. If the number of remaining resources in the candidate set is less than a threshold amount, e.g., a resource free criteria or resource free threshold x%, of the total number of resources, the first wireless communication device may increase the resource exclusion RSRP threshold. For example, the first wireless communication device may increment the RSRP threshold by a particular amount. In an example in which the increment is 4 dB, the first wireless communication device may increase the initial resource exclusion RSRP threshold $\rho_{thresh}^0$ by 4 dB, i.e. $\rho_{thresh}^t = \rho_{thresh}^0 + 4$ dB. If the number of remaining resources in the candidate set is still below x% of the total resources, the first wireless communication device may continue to increase the RSRP threshold, e.g., $\rho_{thresh}^{t+1} = \rho_{thresh}^t + 4$ dB for t=0, 1, 2, 4 and so forth until the number of remaining resources in the candidate set meets or exceeds x% of the total resources. The first wireless communication device may stop at the threshold at which the candidate set includes the threshold percentage of the total resources.

As described above, the first wireless communication device may measure RSRP for each received SCI that reserves resources. If the measured RSRP is greater than $\rho_{thresh}^{0,0}$, the first wireless communication device may remove the reserved resources from the candidate set that overlap with the reserved resources. If the number of remaining resources in the candidate set is less than the resource free threshold (x%), of the total number of resources in the candidate set, the first wireless communication device may increase, or increment, the resource exclusion RSRP threshold. In an example in which the increment is 4 dB, the first wireless communication device may increase the initial resource exclusion RSRP threshold $\rho_{thresh}^{0,0}$ by 4 dB, i.e., $\rho_{thresh}^{t,0} = \rho_{thresh}^{0,0} + 4$ dB. If the number of remaining resources in the candidate set is still below x% of the total resources, the first wireless communication device may continue to increase the RSRP threshold, e.g., $\rho_{thresh}^{t+1,0} = \rho_{thresh}^{t,0} + \Delta$dB for t=0, 1, 2, 4 and so forth until the number of remaining resources in the candidate set meets or exceeds x% of the total resources. In some aspects, the delta value, $\Delta$, corresponds to the increment value, which may be configured, defined, etc. The first wireless communication device may stop at the threshold (e.g., referred to as $\rho_{thresh}^{t,0}$) at which the candidate set includes the threshold percentage of the total resources.

At 712, if the one or more measurements are determined not to exceed the threshold, then the process 700 proceeds to block 714. Otherwise, if the one or more measurements are determined to exceed the threshold, then the process 700 proceeds back to the start prior to block 702.

At 714, the first wireless communication device may transmit the first type of feedback to the second wireless communication device when the one or more measurements do not exceed the threshold. The first wireless communication device may transmit the first type of feedback, e.g., as described in connection with FIGS. 1-6. 714 may be performed by one or more components described with respect to FIG. 4, e.g., processor 459, transmit processor 468, receiver/transmitter 454 and/or antenna 452. The first type of feedback may be transmitted, e.g., by the sidelink feedback component 948 via the transmission component 934 of the apparatus 902 in FIG. 9. In some aspects, the first type of feedback includes an ACK signal and the second type of feedback includes a NACK signal.

At 716, the first wireless communication device may generate a second type of feedback when the data signal is not decodable at the first wireless communication device. 716 may be performed by one or more components described with respect to FIG. 4, e.g., processor 459 and/or transmit processor 468. The second type of feedback may be generated, e.g., by the sidelink feedback component 948 of the apparatus 902 in FIG. 9. In some aspects, the first type of feedback includes an ACK signal and the second type of feedback includes a NACK signal.

At 718, the wireless communication device may transmit the second type of feedback to the second wireless communication device. 718 may be performed by one or more components described with respect to FIG. 4, e.g., processor 459, transmit processor 468, receiver/transmitter 454 and/or antenna 452. The second type of feedback may be transmitted, e.g., by the sidelink feedback component 948 via the transmission component 934 of the apparatus 902 in FIG. 9.

A wireless apparatus may include components that perform each of the blocks of the algorithm in the aforementioned flowchart of FIG. 7. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 7. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 8:
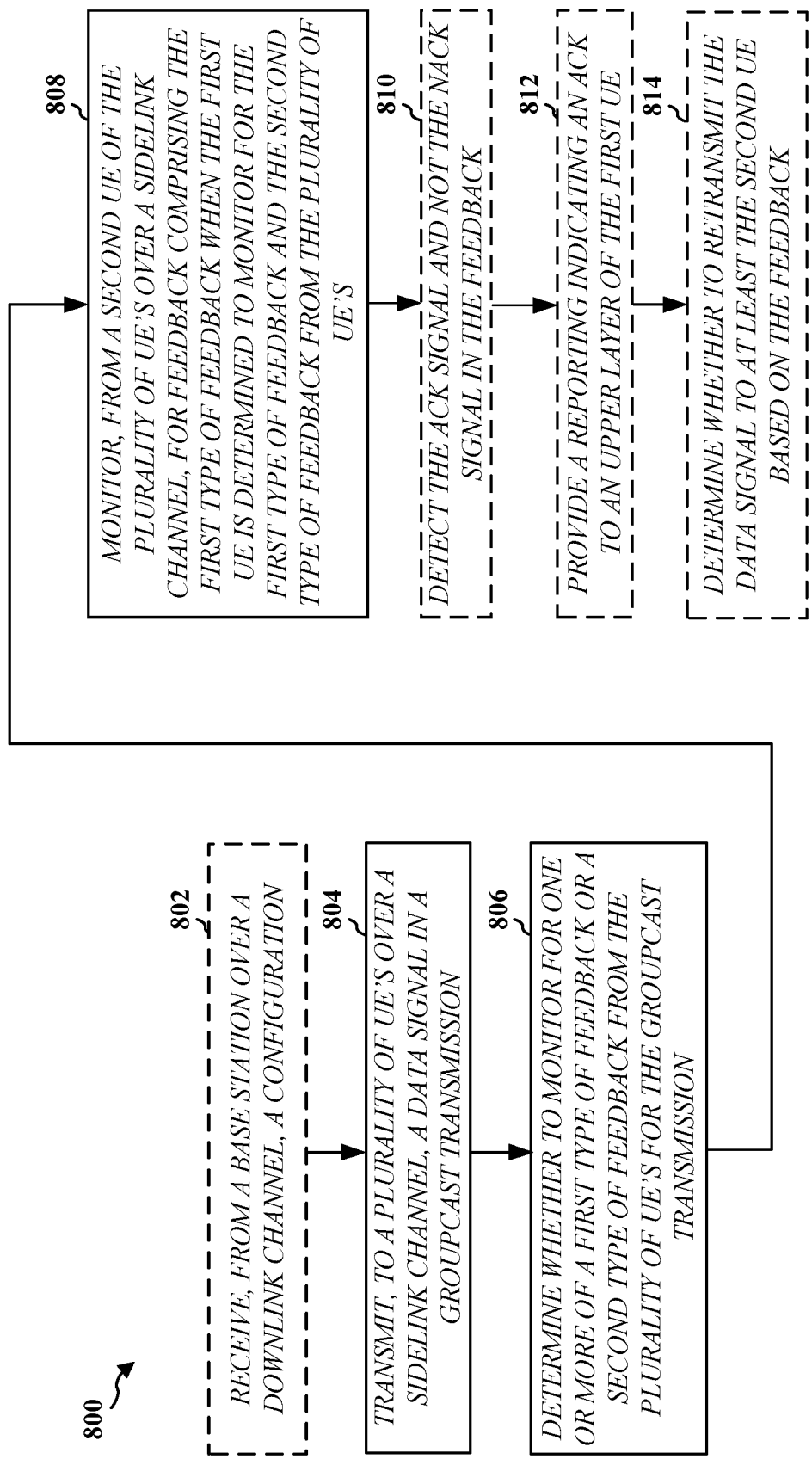
FIG. 8 is an example flowchart of a process of wireless communication at a transmitting UE including acknowledgment feedback for groupcast option 1 sidelink communication, in accordance with aspects presented herein.

FIG. 8 is an example flowchart of a process 800 of wireless communication including acknowledgment feedback for groupcast option 1 sidelink communication. The process 800 may be performed by a wireless communication device (e.g., the UE 104, 502, 504, 506, 508; the device 410 or 450, the RSU 107, 507, which may include memory, a cellular baseband processor, and one or more components configured to perform the process 800). As illustrated, the process 800 includes a number of enumerated steps, but embodiments of the process 800 may include additional steps before, after, and in between the enumerated steps. In some embodiments, one or more of the enumerated steps may be omitted or performed in a different order. Optional aspects are illustrated with a dashed line. The process 800 enables a wireless communication device to randomly select resource without performing a sensing operation and perform the on-demand sensing based on resource reevaluation. Thus, the mechanism may reduce power consumption of UEs while increasing reliability of resource selection in sidelink communication. The process 800 enables the wireless communication device to perform on-demand sensing based on sidelink resource reevaluation.

At 802, a first wireless communication device may receive, from a base station over a downlink channel, a configuration. The first wireless communication device may receive the configuration, e.g., as described in connection with FIGS. 1-6. 802 may be performed by one or more components described with respect to FIG. 4, e.g., processor 459, receive processor 456, receiver/transmitter 454 and/or antenna 452. The configuration may be received, e.g., by the configuration processing component 950 via the reception component 930 of the apparatus 902 in FIG. 9. In some aspects, the first wireless communication device may receive, from a base station over a downlink channel, a configuration indicating a predetermined number of transmissions associated with a same packet of the groupcast transmission for selectively monitoring for first type of feedback and the second type of feedback. In some aspects, the configuration may indicate a quality-of-service metric associated with one or more packets of the groupcast transmission. In some aspects, the configuration may indicate a priority associated with one or more packets of the groupcast transmission. In some aspects, the configuration may indicate mapping information of the second wireless communication device for determining a location of the second wireless communication device from the mapping information based on an application layer configuration.

At 804, the first wireless communication device may transmit, to a plurality of wireless communication devices over a sidelink channel, a data signal in a groupcast transmission. The first wireless communication device may transmit the data signal, e.g., as described in connection with FIGS. 1-6. 804 may be performed by one or more components described with respect to FIG. 4, e.g., processor 459, transmit processor 468, receiver/transmitter 454 and/or antenna 452. The data signal may be transmitted, e.g., by the groupcast transmission component 940 via the transmission component 934 of the apparatus 902 in FIG. 9.

At 806, the first wireless communication device may determine whether to monitor for one or more of a first type of feedback or a second type of feedback from the plurality of wireless communication devices for the groupcast transmission. The first wireless communication device may determine to monitor, e.g., as described in connection with FIGS. 1-6. 806 may be performed by one or more components described with respect to FIG. 4, e.g., processor 459, the channel estimator 458 and/or receive processor 456. The monitoring for the first and/or second types of feedback may be determined, e.g., by the sidelink monitoring component 952 and/or the sidelink feedback component 948 of the apparatus 902 in FIG. 9. In some aspects, the first type of feedback includes an ACK signal and the second type of feedback includes a NACK signal.

In some aspects, the first wireless communication device may determine to monitor for the first type of feedback and the second type of feedback for a first transmission and a first retransmission based on the predetermined number of transmissions indicated in the configuration. In other aspects, the first wireless communication device may determine to monitor for the second type of feedback excluding the first type of feedback for a second retransmission based on the predetermined number of transmissions indicated in the configuration. For example, the first wireless communication device may monitor for an ACK and NACK in the first transmission or in a first retransmission. However, the first wireless communication device may monitor for only a NACK in a second retransmission. In some examples, the first wireless communication device may monitor for only the NACK after each retransmission.

In some aspects, the first wireless communication device may determine to monitor for the one or more of the first type of feedback or the second type of feedback based on the quality-of-service (QoS) metric associated with the one or more packets of the groupcast transmission. For example, the wireless communication device may monitor for an ACK and NACK for packet transmissions that require a particular QoS for higher reliability.

In some aspects, the first wireless communication device may determine to monitor for the one or more of the first type of feedback or the second type of feedback based on the priority associated with the one or more packets of the groupcast transmission. For example, the wireless communication device may monitor for an ACK and NACK for packet transmissions above a certain level of priority for higher reliability.

In some aspects, the first wireless communication device may determine to monitor for the one or more of the first type of feedback or the second type of feedback based on its own location. For example, if the first wireless communication device determines that it is located near a crossroad, the first wireless communication device may determine that it has a higher likelihood of having at least one vulnerable receiving wireless communication device, and hence, begin monitoring for an ACK feedback. For example, the first wireless communication device may monitor for an ACK and NACK for packet transmissions sent to wireless communication devices located behind an obstruction, where these devices have a blocked line of sight or non-line-of-sight path to the first wireless communication device. The first wireless communication device may process the mapping information to determine the location of objects near and/or around the first wireless communication device. In some aspects, the first wireless communication device may determine a location of the second wireless communication device. In some aspects, the second wireless communication device may share its location information with the first wireless communication device and the first wireless communication device may determine the location of the second wireless communication device relative to the location of objects. For example, the first wireless communication device may determine that the second wireless communication device is located near a crossroad where a receiving device is more vulnerable to hidden nodes based on the mapping information of the second wireless communication device.

In some aspects, the first wireless communication device may determine that a number of wireless communication devices are vulnerable to interference from one or more hidden nodes for a duration of time. The first wireless communication device may compare the duration of time to a predetermined duration threshold. In some aspects, the first wireless communication device may determine to monitor for the first type of feedback and the second type of feedback for the groupcast transmission based on the duration of time exceeding the predetermined duration threshold. For example, the first wireless communication device may monitor for an ACK and NACK from these wireless communication devices that have remained vulnerable beyond a certain duration of time. In other aspects, the first wireless communication device may determine to monitor for the second type of feedback excluding the first type of feedback for the groupcast transmission based on the duration of time not exceeding the predetermined duration threshold.

In some aspects, the first wireless communication device may transition into a first HARQ procedure that includes a monitoring operation for the first type of feedback and the second type of feedback when the feedback includes a first type of feedback for a certain number of packets of the groupcast transmission. In some aspects, the first HARQ procedure. In some examples, the first wireless communication device may determine whether the feedback includes the first type of feedback for at least X number of packets of the groupcast transmission, where X is a configurable parameter.

In other aspects, the first wireless communication device may transition into a second HARQ procedure that includes a monitoring operation for the second type of feedback while excluding a monitoring operation for the first type of feedback when the feedback excludes the first type of feedback for a certain number of packets of the groupcast transmission. In some examples, the first wireless communication device may determine whether the feedback excludes the first type of feedback for at least Y number of packets of the groupcast transmission, where Y is a configurable parameter. In some examples, both X and Y parameters are configurable to avoid a ping pong effect with the HARQ procedure transitions.

At 808, the first wireless communication device may monitor, from a second wireless communication device of the plurality of wireless communication devices over a sidelink channel, for feedback comprising the first type of feedback and the second type of feedback when the first wireless communication device is determined to monitor for the first type of feedback and the second type of feedback from the plurality of wireless communication devices. 808 may be performed by one or more components described with respect to FIG. 4, e.g., processor 459, the channel estimator 458 and/or receive processor 456. The first and/or second types of feedback may be monitored, e.g., by the sidelink monitoring component 952 via the reception component 930 of the apparatus 902 in FIG. 9. The first wireless communication device may monitor for the feedback, e.g., as described in connection with FIGS. 1-6. In some aspects, the first wireless communication device may detect the ACK signal and not the NACK signal in the feedback, and may provide a report indicating an ACK to an upper layer of the first wireless communication device based on the detecting. In some aspects, the upper layer may correspond to an RRC layer or a Packet Data Convergence Protocol (PDCP) layer. In other aspects, the first wireless communication device may detect the ACK signal and the NACK signal in the feedback, and may provide a report indicating a NACK to the upper layer of the first wireless communication device based on the detecting. In still other aspects, the first wireless communication device may detect the NACK signal and not the ACK signal in the feedback, and may provide a report indicating a NACK to the upper layer of the first wireless communication device based on the detecting. In yet other aspects, the first wireless communication device may detect no NACK signal and no ACK signal in the feedback when the first wireless communication device is monitoring for the ACK signal, and may provide a report indicating a NACK to an upper layer of the first wireless communication device based on the detecting. In other aspects, the first wireless communication device may detect no NACK signal and no ACK signal in the feedback when the first wireless communication device is not monitoring for the ACK signal, and may provide a report indicating an ACK to an upper layer of the first wireless communication device based on the detecting.

At 810, the first wireless communication device may receive, over a sidelink channel, a resource reservation from a second wireless communication device. In some aspects, the resource reservation may indicate whether there is a collision with the first sidelink resources of the first wireless communication device. The first wireless communication device may receive the resource reservation, e.g., as described in connection with FIGS. 1-6. 810 may be performed by one or more components described with respect to FIG. 4, e.g., processor 459, receive processor 456, receiver/transmitter 454 and/or antenna 452. The resource reservation may be received, e.g., by the sidelink retransmission component 954 via the reception component 930 of the apparatus 902 in FIG. 9. In various implementations, the first wireless communication device may determine whether to retransmit the data signal to at least the second wireless communication device (e.g., receiving UE) based on the feedback. In some aspects, the data signal may be retransmitted, e.g., by the sidelink retransmission component 954 via the transmission component 934 of the apparatus 902 in FIG. 9.

A wireless apparatus may include components that perform each of the blocks of the algorithm in the aforementioned flowchart of FIG. 8. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus for wireless communication may include means for performing any of the blocks of the process described in connection with FIG. 8. The aforementioned means may be one or more of the aforementioned components of the apparatus and/or a processing system of the apparatus configured to perform the functions recited by the aforementioned means. The processing system may include the TX processor 416, 468, the RX processor 470, 456, and the controller/processor 475, 459. As such, in one configuration, the aforementioned means may be the TX processor 416, 468, the RX processor 470, 456, and the controller/processor 475, 459 configured to perform the functions recited by the aforementioned means.

Figure 9:
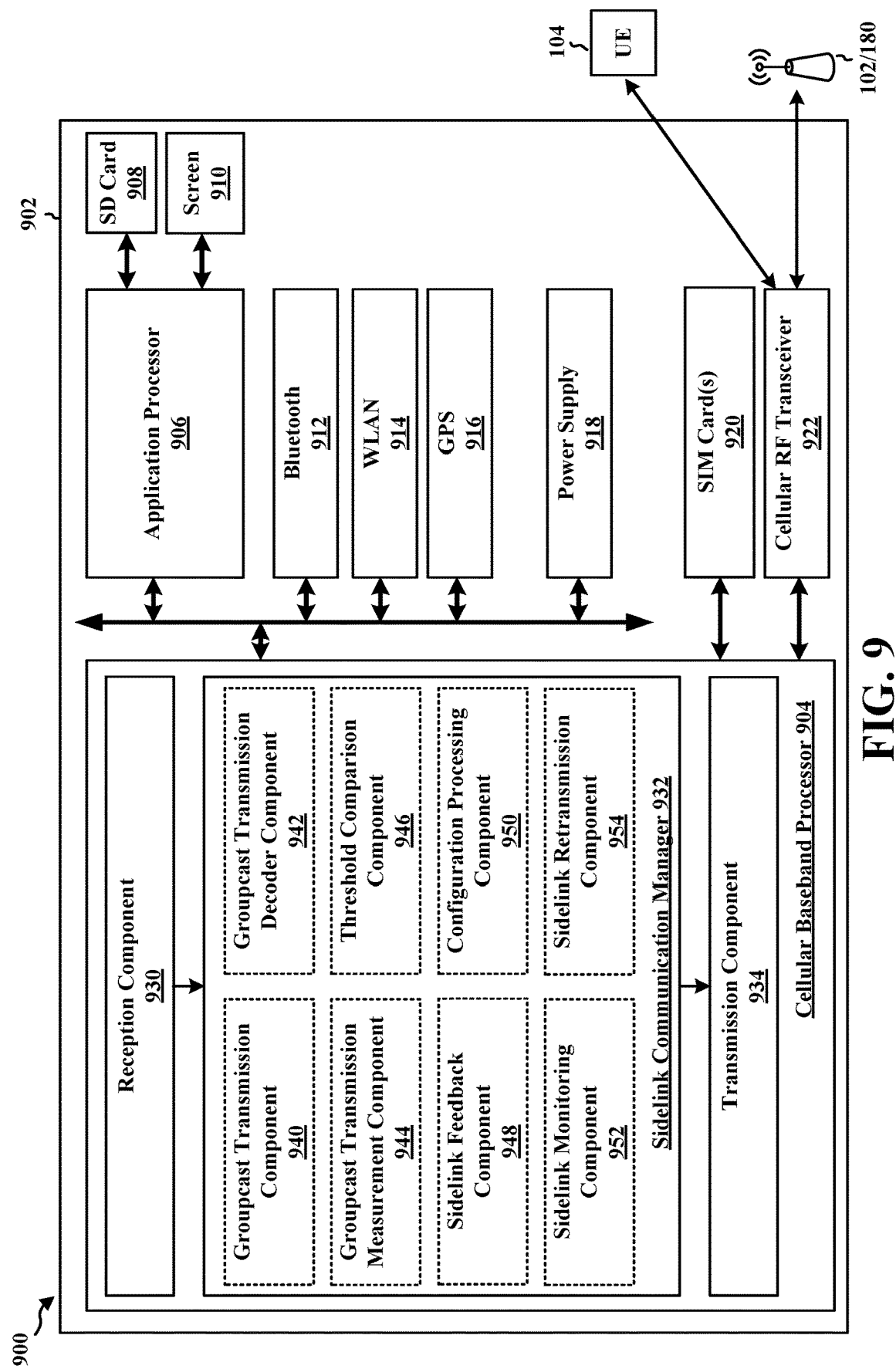
FIG. 9 is a diagram illustrating an example of a hardware implementation for an example apparatus.

FIG. 9 is a diagram 900 illustrating an example of a hardware implementation for an apparatus 902. The apparatus 902 may be a UE or other wireless device that communicates based on sidelink. The apparatus 902 includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with other wireless devices, such as a UE 104 and/or base station 102/180. The cellular baseband processor 904 may include a computer-readable medium/memory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a sidelink communication manager 932, and a transmission component 934. The sidelink communication manager 932 includes the one or more illustrated components. The components within the sidelink communication manager 932 may be stored in the computer-readable medium/memory and/or configured as hardware within the cellular baseband processor 904. The cellular baseband processor 904 may be a component of the device 410 or 450 and may include the memory 460 or 470 and/or at least one of the TX processor 416 or 468, the RX processor 456 or 470, and the controller/processor 459 or 475. In one configuration, the apparatus 902 may be a modem chip and include just the baseband processor 904, and in another configuration, the apparatus 902 may be the entire wireless device (e.g., see the device 410 or 450 of FIG. 4) and include the additional modules of the apparatus 902.

The sidelink communication manager 932 includes a groupcast transmission component 940, a groupcast transmission decoder component 942, a groupcast transmission measurement component 944, a threshold comparison component 946, a sidelink feedback component 948, a configuration processing component 950, a sidelink monitoring component 952 and/or a sidelink retransmission component 954 configured to perform the aspects described in connection with methods in FIG. 7 and/or FIG. 8. The apparatus is illustrated as including components to perform the methods of FIG. 7 and/or FIG. 8, because the wireless device may operate as a transmitting device at times and may operate as a receiving device at other times. In other examples, the apparatus 902 may include components for the method of FIG. 7 without including components configured to perform the method of FIG. 8, or may include components for the method of FIG. 8 without including components configured to perform the method of FIG. 7.

The apparatus 902 may include additional components that perform each of the blocks of the algorithm in the aforementioned flowcharts of FIG. 7 and/or 8. As such, each block in the aforementioned flowcharts of FIG. 7 and/or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for determining whether a data signal associated with a groupcast transmission from a second UE is decodable at the first UE. The apparatus 902 may further include means for obtaining one or more measurements of the data signal when the data signal is decodable at the first UE. The apparatus 902 may further include means for determining whether the one or more measurements exceed a threshold. The apparatus 902 may further include means for transmitting a first type of feedback to the second UE when the one or more measurements do not exceed the threshold.

The apparatus 902 may further include means for transmitting, to a plurality of UEs over a sidelink channel, a data signal in a groupcast transmission. The apparatus 902 may further include means for determining whether to monitor for one or more of a first type of feedback or a second type of feedback from the plurality of UEs for the groupcast transmission. The apparatus 902 may further include means for monitoring, from a second UE of the plurality of UEs over a sidelink channel, for feedback comprising the first type of feedback and the second type of feedback when the first UE is determined to monitor for the first type of feedback and the second type of feedback from the plurality of UEs.

The aforementioned means may be one or more of the aforementioned components of the apparatus 902 configured to perform the functions recited by the aforementioned means. As described supra, the apparatus 902 may include the TX Processor 416 or 468, the RX Processor 456 or 470, and the controller/processor 459 or 475. As such, in one configuration, the aforementioned means may be the TX Processor 416 or 468, the RX Processor 456 or 470, and the controller/processor 459 or 475 configured to perform the functions recited by the aforementioned means.

The following aspects are illustrative only and aspects thereof may be combined with aspects of other examples or teaching described herein, without limitation.

Aspect 1 is a method of wireless communication at a first user equipment (UE), the method comprising: determining whether a data signal associated with a groupcast transmission from a second UE is decodable at the first UE; obtaining one or more measurements of the data signal when the data signal is decodable at the first UE; determining whether the one or more measurements exceed a threshold; and transmitting a first type of feedback to the second UE when the one or more measurements do not exceed the threshold.

In Aspect 2, the method of Aspect 1 further includes generating a second type of feedback when the data signal is not decodable at the first UE; and transmitting the second type of feedback to the second UE.

In Aspect 3, the method of Aspect 1 or Aspect 2 further includes that the first type of feedback comprises an acknowledgment (ACK) signal and the second type of feedback comprises a negative acknowledgment (NACK) signal.

In Aspect 4, the method of any of Aspects 1-3 further includes receiving, from the second UE over a sidelink channel, a control signal, wherein the determining whether the data signal associated with the groupcast transmission from the second UE is decodable comprises: decoding the control signal; and determining that the data signal is decodable based on the control signal.

In Aspect 5, the method of any of Aspects 1-4 further includes receiving, in the groupcast transmission from the second UE over a sidelink channel, the data signal.

In Aspect 6, the method of any of Aspects 1-5 further includes that the obtaining the one or more measurements comprises obtaining one or more of a received signal strength indicator (RSSI) measurement, a reference signal received power (RSRP) measurement, a reference signal received quality (RSRQ) measurement, a signal-to-noise ratio (SNR), or a signal-to-interference-plus-noise ratio (SINR).

In Aspect 7, the method of any of Aspects 1-6 further includes receiving, from a base station over a downlink channel, a configuration indicating a predetermined threshold, the threshold being configured to correspond to the predetermined threshold.

In Aspect 8, the method of any of Aspects 1-7 further includes that the receiving the configuration comprises receiving a downlink configuration in a radio resource control (RRC) signal from a base station.

In Aspect 9, the method of any of Aspects 1-8 further includes monitoring a sidelink channel for a monitoring interval; determining an amount of time that the sidelink channel is busy within the monitoring interval; determining a channel busy ratio that corresponds to ratio of the amount of time that the sidelink channel is busy to a duration of the monitoring interval; and determining the threshold based on the channel busy ratio.

In Aspect 10, the method of any of Aspects 1-9 further includes that the obtaining the one or more measurements comprises: determining a plurality of reference signal received power (RSRP) values of the data signal; ranking the plurality of RSRP values; and determining a lowest measured RSRP value from the plurality of RSRP values of the data signal based on the ranking, further comprising: determining the threshold based on a percentage of the lowest measured RSRP value.

In Aspect 11, the method of any of Aspects 1-10 further includes receiving, from a base station over a downlink channel, a configuration indicating a predetermined percentage, the percentage being configured to correspond to the predetermined percentage.

In Aspect 12, the method of any of Aspects 1-11 further includes that the threshold is equivalent to a summation of a first resource exclusion reference signal received power (RSRP) threshold and a delta value, the delta value being a configurable parameter.

In Aspect 13, the method of any of Aspects 1-12 further includes that the threshold is equivalent to a summation of a second resource exclusion RSRP threshold different than the first resource exclusion RSRP threshold and the delta value.

In Aspect 14, the method of any of Aspects 1-13 further includes that the first resource exclusion RSRP threshold is adjusted by incrementing the first resource exclusion RSRP threshold by a predetermined increment value for each of a number of increments until a number of remaining resources reaches a predetermined percentage of total resources, and wherein the second resource exclusion RSRP threshold corresponds to the adjusted first resource exclusion RSRP threshold.

Aspect 15 is a device including one or more processors and one or more memories in electronic communication with the one or more processors storing instructions executable by the one or more processors to cause the device to implement a method as in any of Aspects 1-14.

Aspect 16 is a system or apparatus including means for implementing a method or realizing an apparatus as in any of Aspects 1-14.

Aspect 17 is a non-transitory computer readable medium storing instructions executable by one or more processors to cause the one or more processors to implement a method as in any of Aspects 1-14.

Aspect 18 is a method of wireless communication at a first user equipment (UE), the method comprising: transmitting, to a plurality of UEs over a sidelink channel, a data signal in a groupcast transmission; determining whether to monitor for one or more of a first type of feedback or a second type of feedback from the plurality of UEs for the groupcast transmission; and monitoring, from a second UE of the plurality of UEs over a sidelink channel, for feedback comprising the first type of feedback and the second type of feedback when the first UE is determined to monitor for the first type of feedback and the second type of feedback from the plurality of UEs.

In Aspect 19, the method of Aspect 18 further includes that the first type of feedback comprises an acknowledgment (ACK) signal and the second type of feedback comprises a negative acknowledgment (NACK) signal.

In Aspect 20, the method of Aspect 18 or Aspect 19 further includes detecting the ACK signal and not the NACK signal in the feedback; and providing a report indicating an ACK to an upper layer of the first UE based on the detecting.

In Aspect 21, the method of any of Aspects 18-20 further includes detecting the ACK signal and the NACK signal in the feedback; and providing a report indicating a NACK to an upper layer of the first UE based on the detecting.

In Aspect 22, the method of any of Aspects 18-21 further includes detecting the NACK signal and not the ACK signal in the feedback; and providing a report indicating a NACK to an upper layer of the first UE based on the detecting.

In Aspect 23, the method of any of Aspects 18-22 further includes detecting no NACK signal and no ACK signal in the feedback when the first UE is determined to monitor for the first type of feedback and the second type of feedback from the plurality of UEs; and providing a report indicating a NACK to an upper layer of the first UE based on the detecting.

In Aspect 24, the method of any of Aspects 18-23 further includes detecting no NACK signal and no ACK signal in the feedback when the first UE is determined to monitor for the second type of feedback while excluding monitoring for the first type of feedback from the plurality of UEs; and providing a report indicating an ACK to an upper layer of the first UE based on the detecting.

In Aspect 25, the method of any of Aspects 18-24 further includes receiving, from a base station over a downlink channel, a configuration indicating a predetermined number of transmissions associated with a same packet of the groupcast transmission for selectively monitoring for first type of feedback and the second type of feedback, wherein the determining comprises: determining to monitor for the first type of feedback and the second type of feedback for a first transmission and a first retransmission based on the predetermined number of transmissions indicated in the configuration, and determining to monitor for the second type of feedback excluding the first type of feedback for a second retransmission based on the predetermined number of transmissions indicated in the configuration.

In Aspect 26, the method of any of Aspects 18-25 further includes receiving, from a base station over a downlink channel, a configuration indicating a quality-of-service metric associated with one or more packets of the groupcast transmission, wherein the determining comprises: determining whether to monitor for the one or more of the first type of feedback or the second type of feedback based on the quality-of-service metric associated with the one or more packets of the groupcast transmission.

In Aspect 27, the method of any of Aspects 18-26 further includes receiving, from a base station over a downlink channel, a configuration indicating a priority associated with one or more packets of the groupcast transmission, wherein the determining comprises: determining whether to monitor for the one or more of the first type of feedback or the second type of feedback based on the priority associated with the one or more packets of the groupcast transmission.

In Aspect 28, the method of any of Aspects 18-27 further includes receiving, from a base station over a downlink channel, a configuration indicating mapping information of the second UE; and determining a location of the second UE from the mapping information based on an application layer configuration, wherein the determining comprises: determining whether to monitor for the one or more of the first type of feedback or the second type of feedback based on a location of the first UE and the location of the second UE.

In Aspect 29, the method of any of Aspects 18-28 further includes determining that a number of the plurality of UEs are vulnerable to interference from one or more hidden nodes for a duration of time, wherein the determining comprises: determining to monitor for the first type of feedback and the second type of feedback for the groupcast transmission based on the duration of time exceeding a predetermined duration threshold, and determining to monitor for the second type of feedback excluding the first type of feedback for the groupcast transmission based on the duration of time not exceeding the predetermined duration threshold.

In Aspect 30, the method of any of Aspects 18-29 further includes determining whether the feedback comprises the first type of feedback for at least X number of packets of the groupcast transmission, wherein X is a configurable parameter; and transitioning into a first hybrid automatic repeat request (HARQ) procedure when the feedback comprises the first type of feedback for the at least X number of packets of the groupcast transmission, the first HARQ procedure comprising a monitoring operation for the first type of feedback and the second type of feedback.

In Aspect 31, the method of any of Aspects 18-30 further includes determining whether the feedback excludes the first type of feedback for at least Y number of packets of the groupcast transmission, wherein Y is a configurable parameter; and transitioning into a second hybrid automatic repeat request (HARQ) procedure when the feedback excludes the first type of feedback for the at least Y number of packets of the groupcast transmission, the second HARQ procedure comprising a monitoring operation for the second type of feedback while excluding a monitoring operation for the first type of feedback.

In Aspect 32, the method of any of Aspects 18-31 further includes determining whether to retransmit the data signal to at least the second UE based on the feedback.

Aspect 33 is a device including one or more processors and one or more memories in electronic communication with the one or more processors storing instructions executable by the one or more processors to cause the device to implement a method as in any of Aspects 18-32.

Aspect 34 is a system or apparatus including means for implementing a method or realizing an apparatus as in any of Aspects 18-32.

Aspect 35 is a non-transitory computer readable medium storing instructions executable by one or more processors to cause the one or more processors to implement a method as in any of Aspects 18-32.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), the method comprising:
   receiving, from a base station over a downlink channel, a configuration indicating a predetermined percentage;
   determining whether a data signal associated with a groupcast transmission from a second UE is decodable at the first UE;
   obtaining one or more measurements of the data signal when the data signal is decodable at the first UE;
   determining a threshold based on a percentage of lowest measured reference signal received power (RSRP) values, the percentage being configured to correspond to the predetermined percentage;
   determining whether the one or more measurements exceed the threshold; and
   transmitting a first type of feedback to the second UE when the one or more measurements do not exceed the threshold.

2. The method of claim 1, further comprising:
   transmitting a second type of feedback to the second UE when the data signal is not decodable at the first UE.

3. The method of claim 2, wherein the first type of feedback comprises an acknowledgment (ACK) signal and the second type of feedback comprises a negative acknowledgment (NACK) signal.

4. The method of claim 1, further comprising:
   receiving, from the second UE over a sidelink channel, a control signal,
   wherein the determining whether the data signal associated with the groupcast transmission from the second UE is decodable comprises:
      decoding the control signal; and
      determining that the data signal is decodable based on the control signal.

5. The method of claim 4, further comprising:
   receiving, in the groupcast transmission from the second UE over the sidelink channel, the data signal.

6. The method of claim 1, wherein the obtaining the one or more measurements comprises obtaining one or more of a received signal strength indicator (RSSI) measurement, a reference signal received power (RSRP) measurement, a reference signal received quality (RSRQ) measurement, a signal-to-noise ratio (SNR), or a signal-to-interference-plus-noise ratio (SINR).

7. The method of claim 1, wherein the receiving the configuration comprises receiving a downlink configuration in a radio resource control (RRC) signal from the base station.

8. The method of claim 1, further comprising:
   monitoring a sidelink channel for a monitoring interval;
   determining an amount of time that the sidelink channel is busy within the monitoring interval;
   determining a channel busy ratio that corresponds to ratio of the amount of time that the sidelink channel is busy to a duration of the monitoring interval; and
   determining the threshold further based on the channel busy ratio.

9. The method of claim 1, wherein the obtaining the one or more measurements comprises:
   determining a plurality of reference signal received power (RSRP) values of the data signal;
   ranking the plurality of RSRP values; and
   determining the lowest measured RSRP values from the plurality of RSRP values of the data signal based on the ranking.

10. An apparatus for wireless communication at a first user equipment (UE), the apparatus comprising:
    at least one processor;
    a transceiver; and
    a memory, coupled to the at least one processor and the transceiver, storing computer executable code, which when executed by the at least one processor, causes the apparatus to:
       receiving, from a base station over a downlink channel, a configuration indicating a predetermined percentage;
       determine whether a data signal associated with a groupcast transmission from a second UE is decodable at the first UE;
       obtain one or more measurements of the data signal when the data signal is decodable at the first UE;
       determine a threshold based on a percentage of lowest measured reference signal received power (RSRP) values, the percentage being configured to correspond to the predetermined percentage;
       determine whether the one or more measurements exceed the threshold; and
       transmit, via the transceiver, a first type of feedback to the second UE when the one or more measurements do not exceed the threshold.

11. The apparatus of claim 10, wherein the at least one processor further causes the apparatus to:
    transmit a second type of feedback to the second UE when the data signal is not decodable at the first UE.

12. The apparatus of claim 11, wherein the first type of feedback comprises an acknowledgment (ACK) signal and the second type of feedback comprises a negative acknowledgment (NACK) signal.

13. The apparatus of claim 10, wherein the at least one processor further causes the apparatus to:
    receive, from the second UE over a sidelink channel, a control signal, and wherein the at least one processor, causing the apparatus to determine whether the data signal associated with the groupcast transmission from the second UE is decodable, further cause the apparatus to:
       decode the control signal; and
       determine that the data signal is decodable based on the control signal.

14. The apparatus of claim 13, wherein the at least one processor further causes the apparatus to:

receive, in the groupcast transmission from the second UE over the sidelink channel, the data signal.

15. The apparatus of claim 10, wherein the one or more measurements include one or more of a received signal strength indicator (RSSI) measurement, a reference signal received power (RSRP) measurement, a reference signal received quality (RSRQ) measurement, a signal-to-noise ratio (SNR), or a signal-to-interference-plus-noise ratio (SINR).

16. The apparatus of claim 10, wherein the configuration indicating the predetermined percentage is received via a downlink configuration in a radio resource control (RRC) signal from the base station.

17. The apparatus of claim 10, wherein the at least one processor further causes the apparatus to:
monitor a sidelink channel for a monitoring interval;
determine an amount of time that the sidelink channel is busy within the monitoring interval;
determine a channel busy ratio that corresponds to ratio of the amount of time that the sidelink channel is busy to a duration of the monitoring interval; and
determine the threshold further based on the channel busy ratio.

18. The apparatus of claim 10, wherein the at least one processor, causing the apparatus to obtain the one or more measurements, further causes the apparatus to:
determine a plurality of reference signal received power (RSRP) values of the data signal;
rank the plurality of RSRP values; and
determine the lowest measured RSRP values from the plurality of RSRP values of the data signal based on the ranking.

* * * * *